United States Patent Office 2,814,615
Patented Nov. 26, 1957

2,814,615

METALLIFEROUS AZO-DYESTUFFS

Christian Zickendraht, Binningen, Switzerland, assignor to Ciba Limited, Basel, Switzerland, a Swiss firm No Drawing. Application April 12, 1954, Serial No. 422,650

Claims priority, application Switzerland April 16, 1953

1 Claim. (Cl. 260—147)

According to the present invention valuable new metalliferous azo-dyestuffs are made by treating a monoazo-dyestuff which is free from sulfonic acid and carboxylic acid groups and corresponds to the general formula (1)     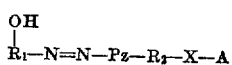

in which $R_1$ represents a benzene radical bound to the azo linkage in ortho-position to the hydroxyl group and containing a —$SO_2NH_2$ group, Pz represents a 5-pyrazolone radical which is bound to the azo linkage in the 4-position, $R_2$ represents an aryl radical, X represents an oxygen atom or a group of the formula

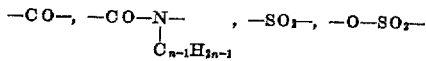

or

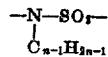

in which $n$ represents a whole number, and A represents an aliphatic or aromatic radical containing more than one carbon atom, with an agent yielding cobalt or chromium under conditions such that a metalliferous azo-dyestuff is formed which contains less than one atom of cobalt or chromium in complex union per molecule of monoazo-dyestuff.

The monoazo-dyestuffs corresponding to the above formula and used as starting materials in the present process can be obtained by coupling an ortho-hydroxy-diazo-compound of the benzene series which is free from carboxylic acid groups and sulfonic acid groups and contains a —$SO_2NH_2$ group, with a pyrazolone which contains an aromatic radical containing the grouping X—A. The aryl radical containing the grouping X—A may be bound in the 3-position of the pyrazolone nucleus by means of a —CO—NH— group. Specially valuable results are obtained, however, with pyrazolones which contain the aforesaid aryl radical bound directly in the 3-position or advantageously in the 1-position.

As pyrazolones suitable in the present invention there may be mentioned the following:

5 - pyrazolone - 3 - carboxylic acid anilide - 3'- or - 4' - sulfonic acid phenylamide, 5 - pyrazolone - 3 - carboxylic acid - N - (3' - paratoluene sulfonylaminophenyl) - amide, 5 - pyrazolone - 3 - carboxylic acid anilide-4' - phenylsulfone, 1 - phenyl - 5 - pyrazolone - 3 - carboxylic acid amide - 3'- or - 4' - sulfonic acid anilide, 1 - (4' - para - toluene - sulfonylamino - phenyl) - 5 - pyrazolone - 3 - carboxylic acid anilide, 3 - phenyl - 5 - pyrazolone - 3'- or - 4' - sulfonic acid anilide, 3 - phenyl-5 - pyrazolone - 3'- or - 4 ' - sulfonic acid phenyl ester, 2' - methyl - 1:3 - diphenyl - 5 - pyrazolone - 3" - sulfonic acid anilide, and above all 1-aryl-3-alkyl-5-pyrazolones such as 1-(3'- or 4'-benzene sulfonylaminophenyl)-3 - methyl - 5 - pyrazolone, 1 - phenyl - 3 - methyl - 5-pyrazolone - 2'- or - 3'- or - 4' - sulfonic acid anilide, 1 - phenyl - 3 - methyl - 5-pyrazolone - 2'- or - 3'- or - 4' - sulfonic acid phenyl ester, 1 - phenyl - 3 - methyl-5 - pyrazolone - 3' - sulfonic acid butylamide, - cyclohexylamide or -para-tolylamide, 1-(2'-chlorophenyl)-3-methyl - 5 - pyrazolone - 4' - or - 5' - sulfonic acid anilide, 1 - (2' - methylphenyl - 3 - methyl - 5 - pyrazolone-4'- or - 5' - sulfonic acid anilide, 1 - (3'- or 4' - ethane-sulfonyloxyphenyl) - 3 - methyl - 5 - pyrazolone, 1 - (3'-or 4' - benzene - sulfonyloxyphenyl) -3 - methyl - 5 - pyrazolone, 1 - 3'- or 4' - benzoyl aminophenyl) - 3 - methyl - 5 - pyrazolone, 1 - phenyl - 3 - methyl - 5 - pyrazolone - 3'- or -4' - carboxylic acid diethylamide, 1 - phenyl-3 - methyl - 5 - pyrazolone - 3' - carboxylic acid isopropylamide or phenylamide, 1 - phenyl - 3 - methyl-5 - pyrazolone - 3'- or -4' - phenyl sulfone, 1 - phenyl-3 - methyl - 5 - pyrazolone, 3'- or 4' - benzylsulfone, and also 1-(2'-, 3'- or 4'-phenoxyphenyl)-3-methyl-5-pyrazolone.

As ortho-hydroxy-diazo-compounds of the benzene series which contain a —$SO_2NH_2$ group there come into consideration for the preparation of the dyestuffs serving as starting materials in the present process diazo-compounds of ortho-hydroxy-amine of the benzene series which may contain further substituents in the nucleus, such as halogen atoms (for example, chlorine), alkyl groups (for example, methyl) alkoxy groups (for example, methoxy), nitro groups, —CO-alkyl groups (for example, —CO—$CH_3$), acylamino groups (for example, acetylamino). Especially valuable are 6-nitro-2-amino-1 - hydroxybenzene - 4 - sulfonic acid amide, 4 - nitro-2 - amino - 1 - hydroxybenzene - 6 -sulfonic acid amide, 4 - chloro - 2 - amino - 1 - hydroxybenzene-5- or -6- sulfonic acid amide and especially 2 - amino - 1 - hydroxybenzene - 4- or - 5 - sulfonic acid amide.

The ortho-hydroxy-diazo compounds may be coupled with the pyrazolones by a method in itself known, for example, in a weakly acid or alkaline medium.

When the reaction is finished the dyestuffs can easily be separated from the coupling mixture for the purpose of metallization by filtration, if desired, after the addition of sodium chloride, as they are only slightly soluble in water. Advantageously they are used for metallization in the form of a filter cake without being dried. In some cases it is also possible to carry out the metallization directly in the coupling mixture without any intermediate separation of the dyestuff.

The monoazo-dyestuffs serving as starting materials in the present process and obtainable as described above, are new. In general, they are not especially soluble in water in the form of their alkali compounds. However, some of them are sufficiently soluble to enable them to be used from dyebaths which require no addition of acid, for example, by the single bath chroming process.

The treatment with an agent yielding cobalt or chromium in accordance with the present invention is carried out in such manner that a metalliferous dyestuff is obtained which contains less than one atom of cobalt or chromium in complex union per molecule of dyestuff. Accordingly, the metallization is advantageously carried out with such an agent yielding cobalt or chromium and by such a method that a complex metal compound of the desired constitution is obtained. In general, it is of advantage to use less than one but at least a half, atomic proportion of cobalt or chromium per molecular proportion of dyestuff and/or to carry out the metallization in a weakly acid to alkaline medium. Therefore, there are especially suitable those agents yielding cobalt or chromium which are stable in alkaline media, for example, chromium compounds of aliphatic dicarboxylic acids or hydroxy-carboxylic acids or advantageously aromatic ortho-hydroxy-carboxylic acids which contain the chromium bound in complex union. As examples of aliphatic dicarboxylic acids or hydroxy-carboxylic acids there may be mentioned, inter alia, oxalic acid, lactic acid, glycollic acid, citric acid and especially tartaric acid, and among the aromatic ortho-hydroxy-carboxylic acids, for example those of the benzene series such as 4-, 5- or 6-methyl-1-hydroxybenzene-2-carboxylic acid and above all 1-hydroxybenzene-2-carboxylic acid itself. As agents yielding cobalt there are advantageously used simple compounds of divalent cobalt such as cobalt sulfate or cobalt acetate or if desired, cobalt hydroxide.

Conversion of the dyestuffs into the complex cobalt or chromium compounds is advantageously carried out at a raised temperature, under atmospheric or superatmospheric pressure, for example, at the boiling temperature of the reaction mixture, if desired, in the presence of suitable additions, for example, salts of organic acids, bases, organic solvents or other agents assisting the formation of complexes.

In one form of the process of the invention an azo-dyestuff of the Formula 1 is metallized in the form of a mixture, that is to say, a mixture of two different metallizable monoazo dyestuffs is used as starting material both of which dyestuffs correspond to the Formula 1 or one of which corresponds to that formula and the other is an ortho:ortho'-dihydroxy-monoazo-dyestuff of the benzene-azo-naphthalene series free from sulfonic acid and carboxylic acid groups, and advantageously one which contains a sulfonic acid amide group.

Instead of using as starting materials ortho:ortho'-dihydroxy-monoazo-dyestuffs of the above Formula 1 there may also be used with good results the corresponding ortho-alkoxy-ortho'-hydroxy-monoazo-dyestuffs or ortho-acyloxy-ortho'-hydroxy-monoazo-dyestuffs, the metallization being carried out under conditions such that the alkyl group is split off from the ortho-alkoxy-ortho'-hydroxy-azo-grouping or the acyl group is split off from the ortho-acyloxy-ortho'-hydroxy-azo-grouping.

The products of the present invention are cobalt or chromium compounds, which contain two monoazo-dyestuffs in a complex in which the ratio of the number of cobalt or chromium atoms bound in complex union to the number of monoazo-dyestuff molecules bound to the atom of chromium or cobalt in complex union is smaller than 1:1, and is advantageously about 1:2, and in which the two monoazo-dyestuffs are ortho:ortho'-dihydroxy-monoazo-dyestuffs free from sulfonic acid and carboxylic acid groups, of which one corresponds to the general Formula 1 and the other is an ortho:ortho'-dihydroxy-monoazo-dyestuff of the benzene-azo-naphthalene series or also corresponds to the Formula 1. Especially valuable are cobalt and chromium compounds of this kind which contain two identical monoazo-dyestuffs of the general formula 1.

The new cobaltiferous and chromiferous dyestuffs are soluble in water and are indeed more soluble than the metal-free dyestuffs used for making them. They are suitable for dyeing and printing a very wide variety of materials, especially for dyeing animal materials such as silk, leather and especially wool, but also for dyeing or printing synthetic fibers of superpolyamides, superpolyurethanes or polyacrylonitrile. In contradistinction to the chromium compounds of dyestuffs containing sulfonic acid groups, which are advantageously used for dyeing from strong acid baths, for example, sulfuric acid baths, the new metal compounds of monoazo-dyestuffs free from sulfonic acid groups are especially suitable for dyeing from weakly alkaline, neutral to weakly acid, advantageously acetic acid, baths. The dyeings so obtained are distinguished by their level character, very good properties of wet fastness and very good fastness to light.

The following examples illustrate the invention, the parts and percentages being by weight:

*Example 1*

18.8 parts of 2-amino-1-hydroxybenzene-4-sulfonic acid amide are dissolved in 50 parts of water and 14 parts of hydrochloric acid of 30 percent strength, and diazotization is carried out at 0–5° C. with an aqueous solution of 6.9 parts of sodium nitrite. The diazo-suspension is neutralized with sodium carbonate and poured at 10–12° C. into a solution of 33 parts of 1-phenyl-3-methyl-5-pyrazolone-3'-sulfonic acid anilide, 50 parts of water and 14 parts of sodium hydroxide solution of 30 percent strength. When the the coupling is finished the mixture is filtered. The moist filter cake is stirred in 250 parts of water and mixed with 120 parts of a solution of sodium chromosalicylate having a chromium content of 2.6 percent and with 6.7 parts of sodium hydroxide solution of 30 percent strength. The whole is boiled for 3 hours under reflux. At the end of this period the chroming is finished. The dyestuff is isolated by evaporation in vacuo. It is a red-brown powder which is easily soluble in water and dyes wool from a weakly alkaline, neutral or acetic acid bath fast orange tints.

By dissolving the above-mentioned metal-free dyestuff in 500 parts of water and 26 parts of sodium hydroxide solution of 30 percent strength, there is obtained after the addition of 300 parts of a solution of cobalt sulfate having a cobalt content of 1.05 percent and heating the mixture for ½ hour at 80–85° C., the corresponding cobalt compound of the dyestuff. It is a yellow-brown water-soluble powder, which dyes wool from a weakly alkaline, neutral or acetic acid bath fast brown-yellow tints.

The 1-phenyl-3-methyl-5-pyrazolone-3'-sulfonic acid anilide may be prepared, for example, by reducing to an amino group the nitro group in the 3-nitrobenzene-sulfanilide obtained by condensing 3-nitrobenzene-sulfochloride with aniline, diazotizing the said sulfanilide, converting the resulting diazo-compound by reduction into the corresponding hydrazine, and condensing the latter with acetoacetic acid ethyl ester to form the desired pyrazolone.

In the following table are given further complex metal compounds which can be obtained by the method described above. In column I are given the diazo-components used, in column II the azo components and in column III the metals. In column IV are given the tints of the dyeings obtainable by dyeing wool with the corresponding metal complexes from neutral or acetic acid baths.

| | I<br>Diazo-component | II<br>Azo-components | III<br>Metal | IV<br>Dyeing on wool |
|---|---|---|---|---|
| 1... | 2-aminophenol-4-sulfonamide (OH, NH₂, SO₂NH₂) | 1-(4'-cyclohexylcarbonylaminophenyl)-3-methyl-5-pyrazolone | Cr<br>Co | Orange.<br>Brown yellow. |
| 2... | 2-aminophenol-4-sulfonamide (OH, NH₂, SO₂NH₂) | 1-[3'-methyl-4'-(N-isopropylsulfamoyl)phenyl]-3-methyl-5-pyrazolone | Cr<br>Co | Orange.<br>Brown yellow. |
| 3... | 2-aminophenol-4-sulfonamide (OH, NH₂, SO₂NH₂) | 1-[4'-(N-methyl-N-phenylsulfamoyl)phenyl]-3-methyl-5-pyrazolone | Cr<br>Co | Orange.<br>Brown yellow. |
| 4... | 2-aminophenol-4-sulfonamide (OH, NH₂, SO₂NH₂) | 1-[4'-(N-ethylsulfamoyl)phenyl]-3-methyl-5-pyrazolone | Cr<br>Co | Orange.<br>Brown yellow. |
| 5... | 2-aminophenol-4-sulfonamide (OH, NH₂, SO₂NH₂) | 1-[4'-(N-phenylsulfamoyl)phenyl]-3-methyl-5-pyrazolone | Cr<br>Co | Orange.<br>Brown yellow. |
| 6... | 4-amino-3-hydroxybenzenesulfonamide (OH, NH₂, H₂N-O₂S) | 1-[4'-(N-phenylsulfamoyl)phenyl]-3-methyl-5-pyrazolone | Cr | Scarlet. |
| 7... | 4-amino-3-hydroxy-6-chlorobenzenesulfonamide (OH, NH₂, H₂N-O₂S, Cl) | 1-[4'-(N-phenylsulfamoyl)phenyl]-3-methyl-5-pyrazolone | Cr | Red. |

| | I<br>Diazo-component | II<br>Azo-components | III<br>Metal | IV<br>Dyeing on wool |
|---|---|---|---|---|
| 8 | 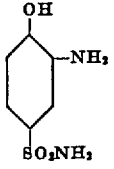 | 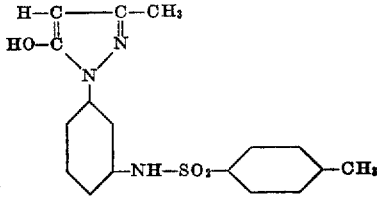 | Cr<br>Co | Orange.<br>Brown yellow. |
| 9 | 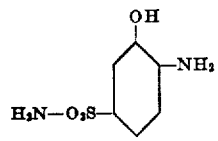 | 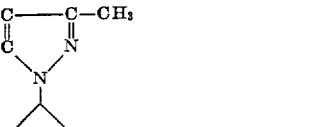 | Cr<br>Co | Scarlet.<br>Brown orange. |
| 10 | 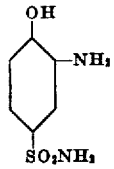 | 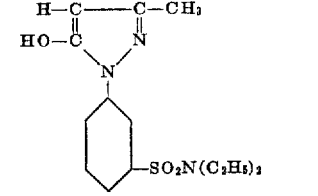 | Cr<br>Co | Orange.<br>Brown yellow. |
| 11 | 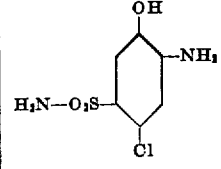 | 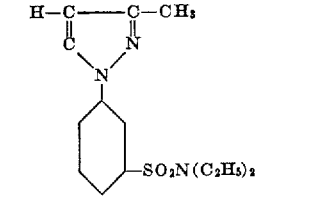 | Cr | Red. |
| 12 | 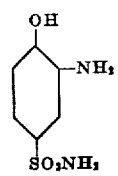 | 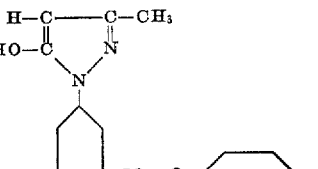 | Cr<br>Co | Orange.<br>Brown yellow. |
| 13 | 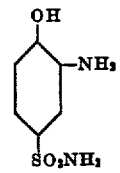 | 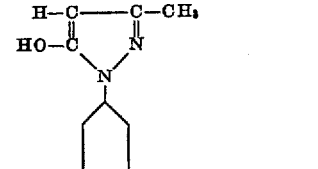 | Cr | Brown yellow. |
| 14 | 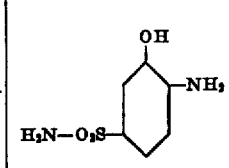 | 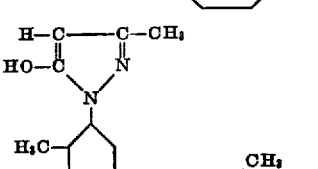 | Cr | Scarlet. |
| 15 | 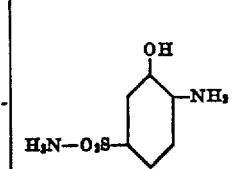 | 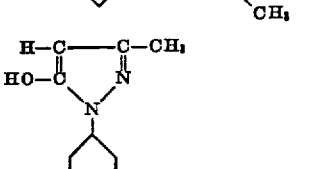 | Cr | Red. |

| | I<br>Diazo-component | II<br>Azo-components | III<br>Metal | IV<br>Dyeing on wool |
|---|---|---|---|---|
| 16 | 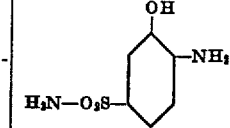 | 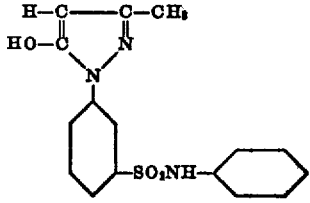 | Cr | Scarlet. |
| 17 | 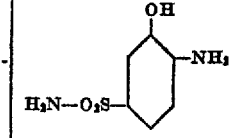 | 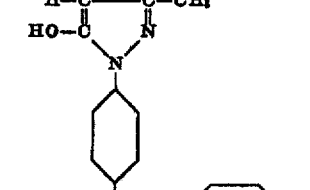 | Cr | Do. |
| 18 | 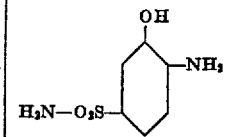 | 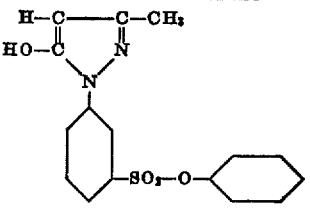 | Cr | Do. |
| 19 | 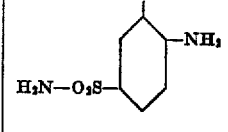 | 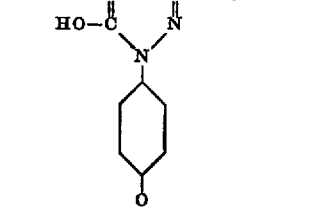 | Cr | Do. |
| 20 | 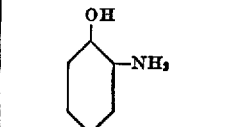 | 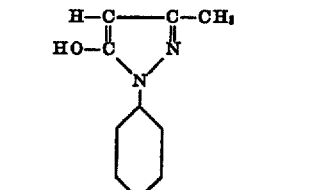 | Cr | Orange. |
| 21 | 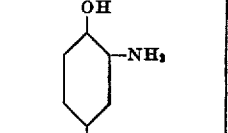 | 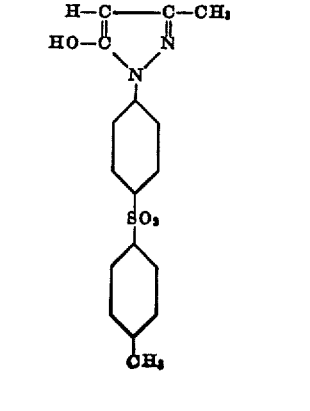 | Cr | Do. |

| I Diazo-component | II Azo-components | III Metal | IV Dyeing on wool |
|---|---|---|---|
| 22. $O_2N-\underset{SO_2NH_2}{\underset{|}{C_6H_2}}(OH)(NH_2)$ | 1-phenyl-3-methyl-pyrazolone with N-isopropyl sulfonamide substituent | Cr | Orange red. |

Example 2

28.2 parts of the sodium salt of the dyestuff from diazotized 2-amino-1-hydroxybenzene-4-sulfonic acid amide and 1-phenyl-3-methyl-5-pyrazolone-3'-sulfonic acid-N-methylanilide and 21.8 parts of the sodium salt of the dyestuff from 2-amino-1-hydroxybenzene-4-sulfonic acid methylamide and 1-acetylamino-7-hydroxynaphthalene, both dyestuffs being in the form of a moist paste (filter cake), are dissolved in 800 parts of water with the addition of 4.0 parts of sodium hydroxide. After the addition of 120 parts of a solution of sodium chromosalicylate having a chromium content of 2.6 percent, the whole is boiled for 4–5 hours under reflux. The chromiferous mixed complex is precipitated by the addition of sodium chloride and neutralization with acetic acid. When dry the dyestuff is a dark water-soluble powder, which dyes wool from a neutral to acetic acid bath fast brown tints.

Example 3

100 parts of well wetted wool are entered at 40–50° C. into a dyebath which contains in 4000 parts of water 1 part of the chromiferous dyestuff obtainable as described in the first paragraph of Example 1, then 2 parts of acetic acid of 40 percent strength are added, the bath is raised to the boil in the course of ½ hour, and dyeing is carried on for ¾ hour at the boil. Finally the wool is rinsed with cold water and dried. There is obtained a full orange dyeing having good properties of wet fastness and a good fastness to light.

The same result is obtained when the dyebath contains no acetic acid.

By the use of 100 parts of superpolyamide fibers (nylon fibers), instead of 100 parts of wool, there is likewise obtained an orange dyeing having good properties of wet fastness and a good fastness to light.

What is claimed is:

The complex chromium compound containing one atom of chromium bound in complex union with substantially two molecules of the monoazo dyestuff of the formula

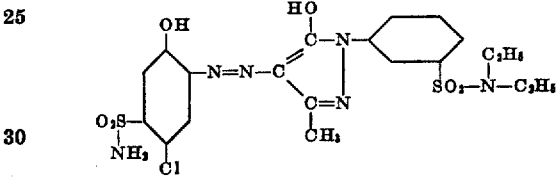

References Cited in the file of this patent

UNITED STATES PATENTS

| 1,623,005 | Gubler et al. | Mar. 29, 1927 |
| 1,908,571 | Straub et al. | May 9, 1933 |
| 2,429,600 | Beech et al. | Oct. 28, 1947 |
| 2,565,898 | Widmer et al. | Aug. 28, 1951 |
| 2,606,185 | Widmer et al. | Aug. 5, 1952 |
| 2,727,031 | Zickendraht et al. | Dec. 13, 1955 |

FOREIGN PATENTS

| 513,360 | Belgium | Feb. 6, 1953 |
| 291,812 | Switzerland | Oct. 1, 1953 |

UNITED STATES PATENT OFFICE
Certificate of Correction

Patent No. 2,814,615                                         November 26, 1957

Christian Zickendraht

It is hereby certified that error appears in the printed specification of the above numbered patent requiring correction and that the said Letters Patent should read as corrected below.

Column 2, line 27, for "1-3'- or 4'-" read —1-(3'- or 4'- —; line 33, for "pyrazolone," read —pyrazolone- —; line 40, for "ortho-hydroxy-amine" read —ortho-hydroxy-amines—; columns 7 and 8, in the table, column II thereof, opposite item 11, the upper portion of the formula should appear as shown below instead of as in the patent—

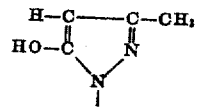

Signed and sealed this 15th day of April 1958.

[SEAL]

Attest:
KARL H. AXLINE,
*Attesting Officer.*

ROBERT C. WATSON,
*Commissioner of Patents.*